United States Patent [19]

Carmichael et al.

[11] 4,184,504
[45] Jan. 22, 1980

[54] WELLHEAD VALVE REMOVAL AND INSTALLATION TOOL

[75] Inventors: James T. Carmichael, Shreveport; Robert J. Diehl, Vivian; William L. Godare, Shreveport, all of La.

[73] Assignee: W-K-M Wellhead Systems, Inc., Shreveport, La.

[21] Appl. No.: 859,402

[22] Filed: Dec. 12, 1977

[51] Int. Cl.² ............... F16L 55/12; F16K 43/00
[52] U.S. Cl. .................. 137/15; 29/157.1 R; 29/402.08; 137/315; 137/318; 138/89; 138/94; 408/229; 408/83.5
[58] Field of Search ............... 90/12R, DIG. 8; 29/157.1 R, 401 F; 137/15, 315, 318; 138/89, 94; 228/125; 251/61, 62; 408/99, 100, 110, 111, 136, 229

[56] References Cited

U.S. PATENT DOCUMENTS

| | | | |
|---|---|---|---|
| 1,997,878 | 4/1935 | Wagner | 138/89 X |
| 2,763,282 | 9/1956 | Reedy et al. | 138/94 |
| 2,788,683 | 4/1957 | Evans | 408/99 |
| 2,899,983 | 8/1959 | Farris | 138/94 |
| 2,911,859 | 11/1959 | Longley et al. | 137/318 |
| 3,275,023 | 9/1966 | Raspante | 137/315 |
| 3,473,555 | 10/1969 | Martin et al. | 137/315 |
| 3,844,007 | 10/1974 | Kojima | 90/DIG. 8 |
| 4,019,541 | 4/1977 | Koppl | 138/94 |
| 4,127,141 | 11/1978 | Ledonne et al. | 138/94 |

Primary Examiner—Martin P. Schwadron
Assistant Examiner—G. L. Walton
Attorney, Agent, or Firm—Eugene N. Riddle

[57] ABSTRACT

A tool for removing and replacing wing valves or master valves on an operating wellhead under pressure includes an elongated housing with a fluid coupling on one end for connecting to the outlet end of a wellhead valve and a packing assembly extending from the housing through the valve into the wellhead where it seals fluid flow to the valve. A latch on the packing assembly is used to secure it in the wellhead. The housing is equipped with a manipulator to expand and retract the packing and to engage and release the latch. An auxiliary reaming tool is provided for mounting with the manipulator and inserting through the valve to smooth the bore of a wellhead conduit if necessary prior to inserting the packing assembly into the conduit.

19 Claims, 15 Drawing Figures

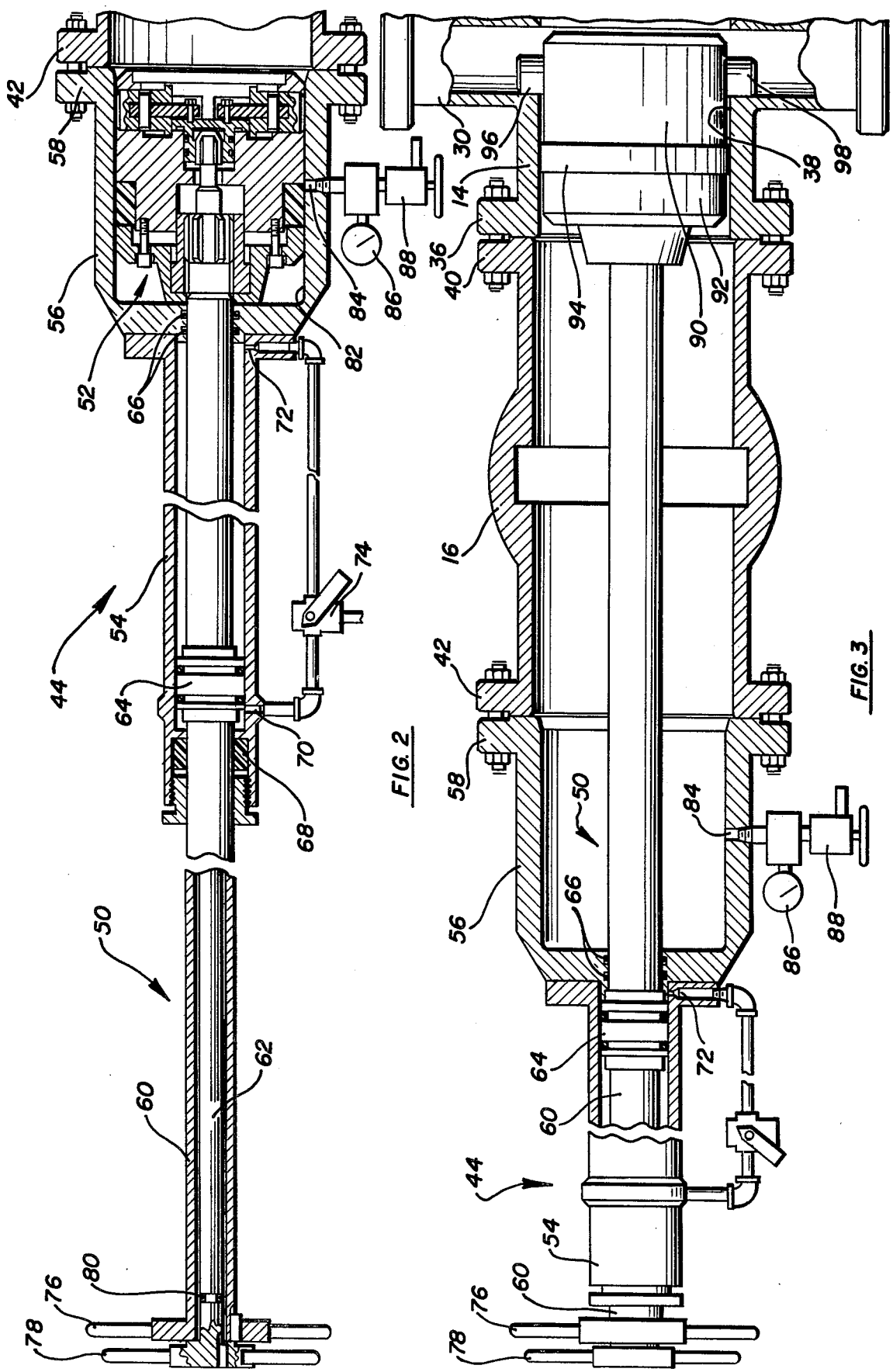

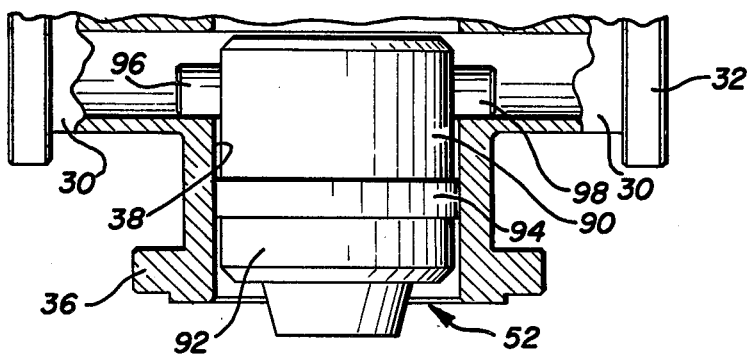
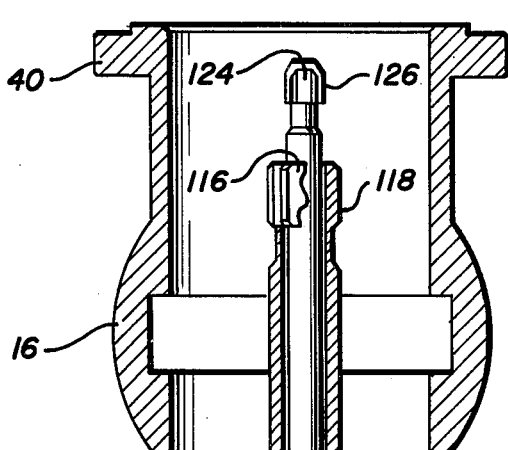
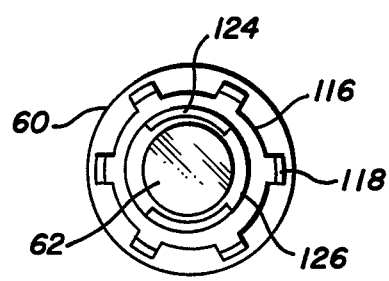
FIG.6
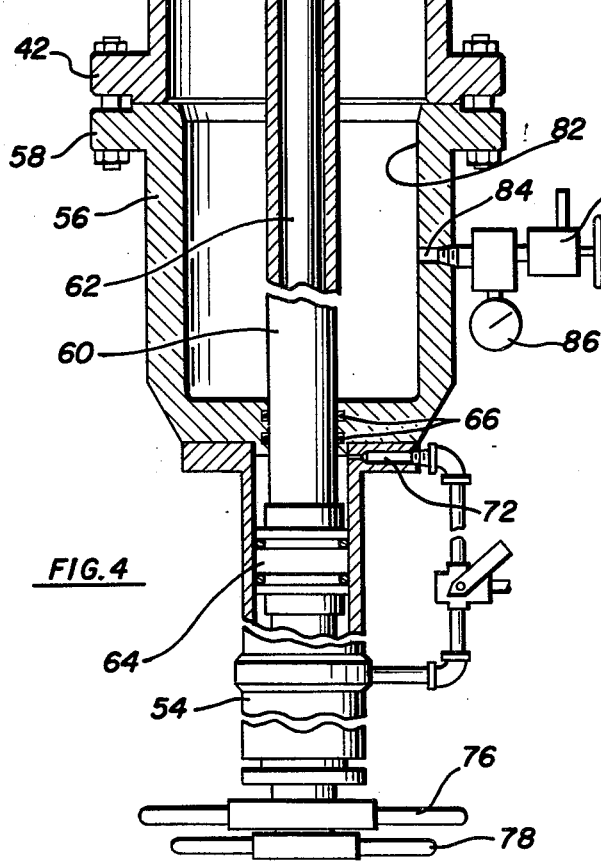
FIG.4
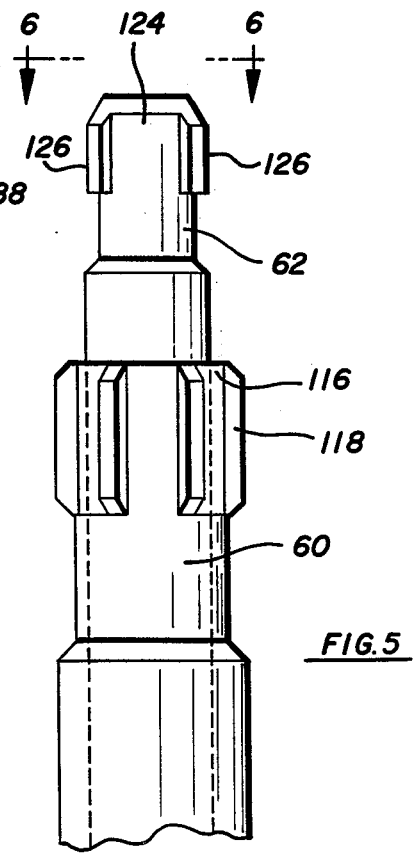
FIG.5

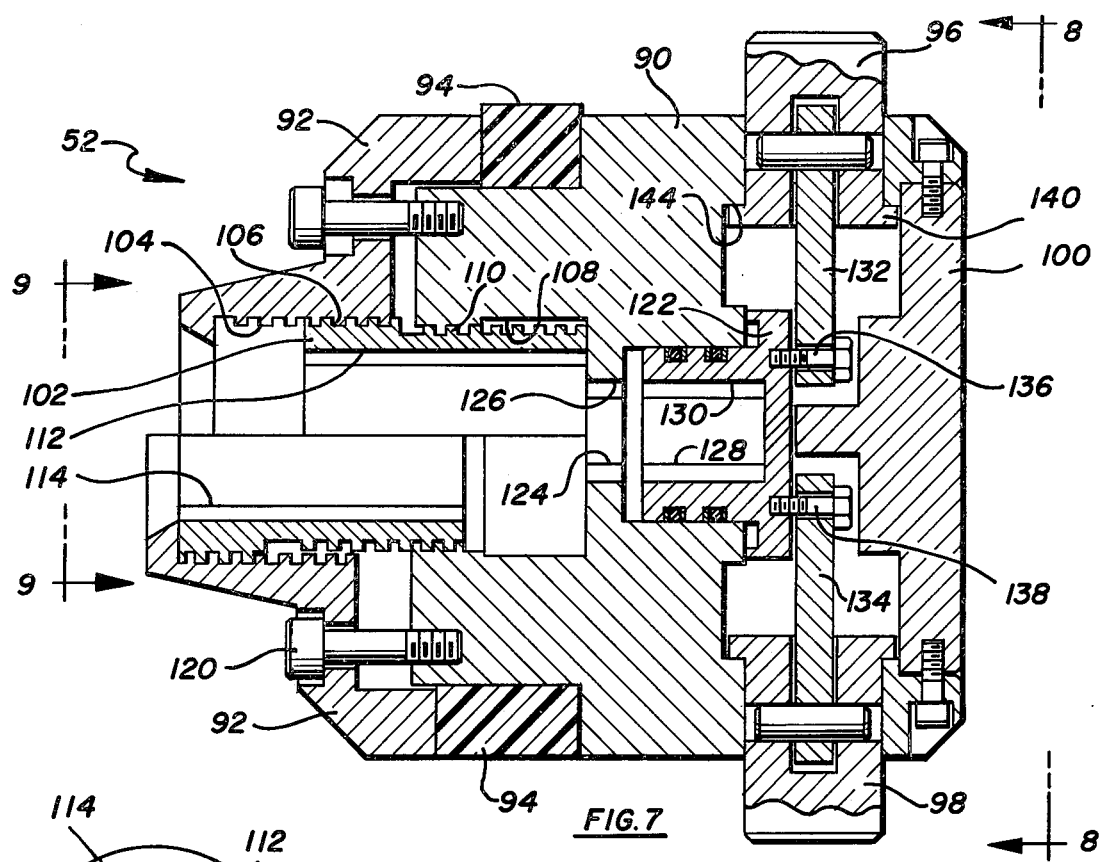
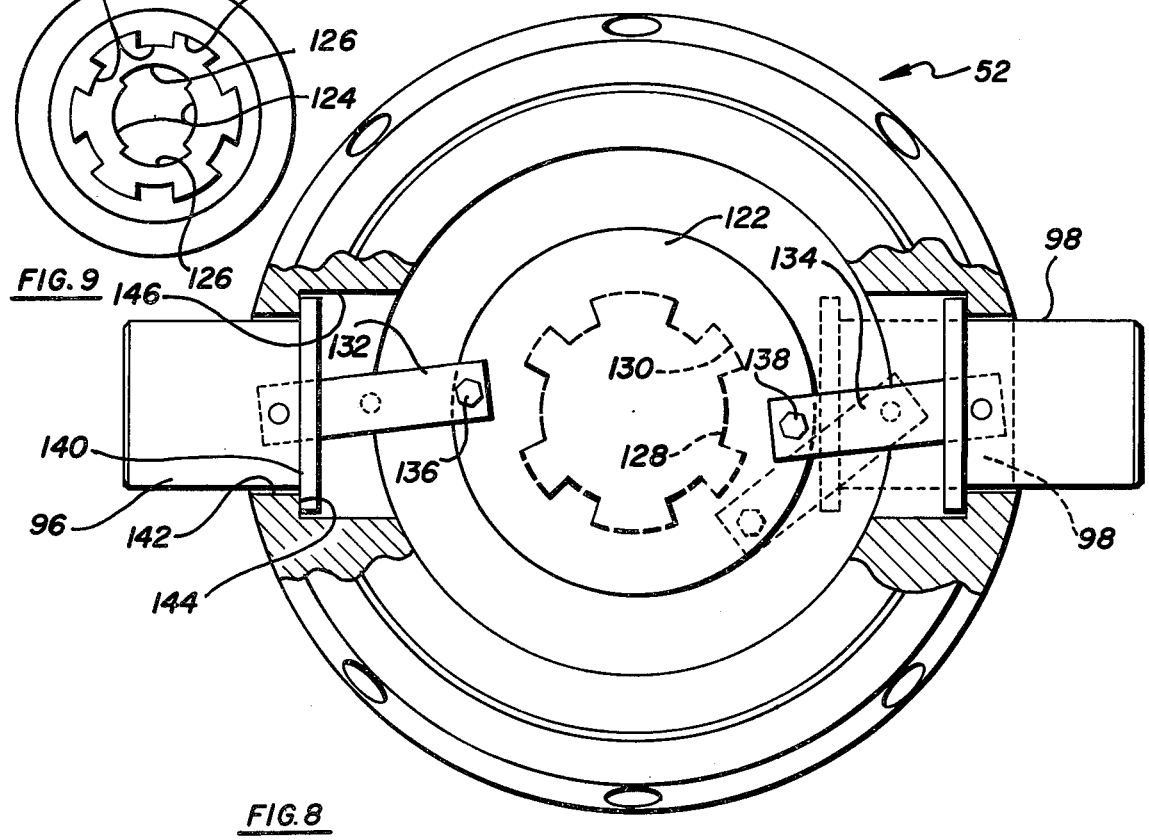
FIG.7
FIG.9
FIG.8

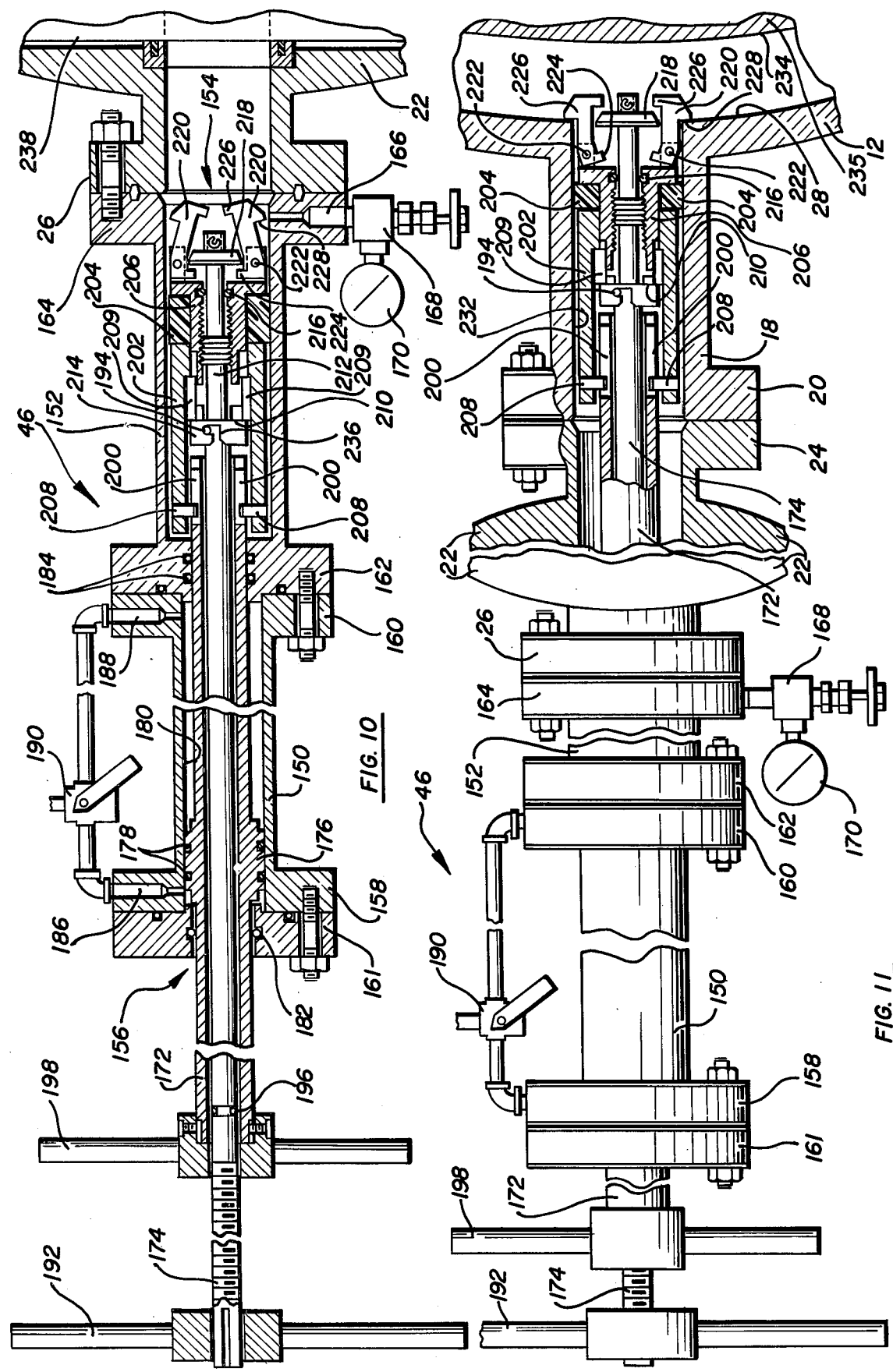

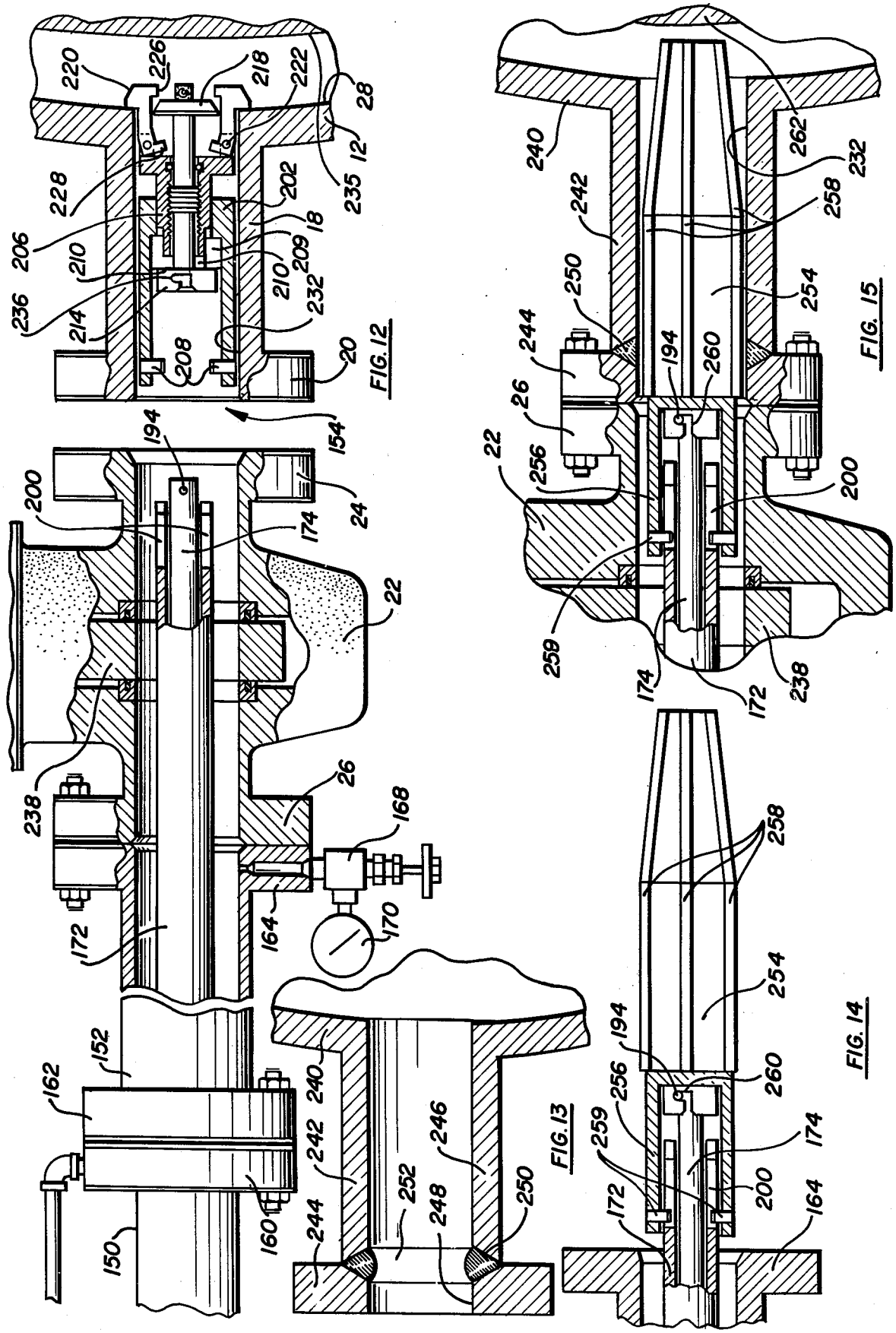

WELLHEAD VALVE REMOVAL AND INSTALLATION TOOL

BACKGROUND OF THE INVENTION

This invention is related to tools used for removing and replacing valves which are in a system that must remain pressurized. The tool of this invention is designed for use on wellhead assemblies to remove wing valves from the side of the casing bowl or spool assembly and also to remove and replace master valves. The tool includes a packing assembly that is temporarily securable to a wellhead so the valve can be removed while the remainder of the system is pressurized.

One device is known in the prior art for removing wing valves and the like from a wellhead assembly, such is shown in U.S. Pat. No. 2,250,244 issued July 12, 1941 to J. R. Yancey. This device has a threaded portion in the bore of the wellhead and a threaded plug which is inserted through the valve by a suitable manipulator and screwed into the threaded portion to seal the fluid flow into the valve. While this scheme may function well on new equipment, the threaded portion of the bore will obviously be deteriorated by abrasive crude oil flowing through the conduit after a period of time. Deterioration of this threaded portion of the bore will render this type of tool unusable or at most unsafe considering the high pressures often encountered in wellhead assemblies.

Other devices are known in the art for plugging pipes so that valves can be installed directly in the flowline or joined transverse to the flowline by a flange. Two of these devices are shown in U.S. Pat. No. 2,780,224 to H. J. Lee issued Feb. 5, 1957 and U.S. Pat. No. 3,170,226 to T. A. Larry issued Feb. 23, 1965. The patent of M. M. Raspante, U.S. Pat. No. 3,275,023 issued Sept. 27, 1966 discloses a device for removing valves from large diameter water tanks and the like where the inside of the tank is relatively flat. None of these valve removal tools are particularly adapted for use on wellheads where high pressures (up to 30,000 pounds per square inch) and high temperatures (up to 1,500 degrees F.) may be encountered.

SUMMARY OF THE INVENTION

In all the embodiments of this invention the tool has an elongated housing with a fluid coupling on one end which is mountable with the fluid coupling of a valve. An extendable manipulator is positioned through the housing and will exit at the fluid coupling. A packing assembly is mountable with the manipulator and inserted through the valve into the wellhead where it is expanded to temporarily block fluid flow through the conduit. A latch is provided on the packing assembly to temporarily secure it inside the wellhead in opposition to pressure fluid in the wellhead. The manipulator is used to expand and contract the packing and to engage and release the latch.

In one specific embodiment designed for removing master valves from a wellhead assembly, the packing is expanded by the tightening of a dual diameter and a dual pitch connector member which compresses a packing ring between a body member and an end member. In this embodiment the latch has a pair of radially outwardly movable latch members shaped like plungers which are displaced outwardly into wing valve conduits of the wellhead assembly.

In another embodiment of this invention designed to remove wing valves from a wellhead assembly, the packing ring is expanded by rotation of a single threaded connector member which compresses the packing ring between two portions of the packing assembly. In this embodiment the latch has a plurality of radially movable and pivotally mounted members which are extended and retracted into the wellhead spool or bowl by motion of the connector member that activates the packing ring.

In another embodiment an auxiliary reaming tool or reamer is provided for mounting with the manipulator and insertion through the valve in order to smooth the bore of the conduit adjoining the valve. The auxiliary reamer is used before the packing assembly is inserted in order to smooth the bore of the conduit so the packing assembly can be inserted to seal the conduit.

One object of this invention is to provide a tool for the removing and replacing of valves on an operating wellhead which overcomes the disadvantages of the aforementioned devices.

Still one other object of this invention is to provide a tool that is usable for conveniently and relatively easily removing and replacing wing valves and master valve on both oilfield type and geothermal type wellhead assemblies.

Still, another object of this invention is to provide a tool for removing and replacing of valves on a wellhead assembly wherein the tool has a powerable piston and cylinder arrangement on a manipulator that inserts and actuates a packing and latching assembly for sealing the fluid flow to the valve.

Various other objects, advantages, and features of this invention will become apparent to those skilled in the art from the following discussion, taken in conjunction with the accompanying drawings, in which:

DESCRIPTION OF THE DRAWINGS

FIG. 2 is a shortened cutaway elevation view of the embodiment of the master valve tool shown in FIG. 1 with the manipulator and packing assembly in a fully retracted position;

FIG. 3 is a cutaway elevation view of the master valve tool, a master valve, and the upper portion of a wellhead with the manipulator extending through the master valve and the packing and the latching assembly in place in the upper portion of the wellhead with the packing expanded and the latch members extended;

FIG. 4 is a cutaway elevation view of the master valve tool and a portion of the wellhead with the packing and latching assembly in place in the upper portion of the wellhead and the tool with the master valve attached displaced from the wellhead;

FIG. 5 is an enlarged elevation view of the coupling end portion of the master valve tool manipulator;

FIG. 6 is an end elevation view of the master valve tool manipulator taken on line 6—6 of FIG. 5;

FIG. 7 is an enlarged cross-sectional elevation view of the master valve tool packing and latching assembly with the latching members in the extended position and the packing assembly portion of the view split wherein the upper left hand portion of the figure illustrates the packing assembly in an expanded position and the other remainder of the view illustrates the packing assembly in a released or non-expanded position;

FIG. 8 is an end elevation view of the master valve tool packing and latching assembly taken from the position of line 8—8 of FIG. 7 with the end cover of this assembly removed for clarity and showing the hub and latch members in an extended position with one of the latch members shown in dashed lines in a retracted position;

FIG. 9 is an end elevation view of the master valve tool showing the manipulator connection portion thereof with the view taken on line 9—9 of FIG. 7;

FIG. 10 is a cutaway elevation view of the wing valve removal tool embodiment of this invention with the manipulator and packing assembly in the retracted position and mounted on the fluid coupling of a wing valve on a wellhead assembly;

FIG. 11 is a shortened partially cutaway elevation view of the wing valve tool wherein the manipulator is extended through the wing valve and the packing assembly is secured in the wellhead;

FIG. 12 is a cutaway elevation view of a portion of the wing valve tool, the valve, and the wellhead as shown in FIG. 11 with the tool and the wing valve removed from the wing valve conduit and the packing assembly secured in place in the wellhead;

FIG. 13 is a cross-sectional elevation view of a wing valve conduit and adjoining portion of a wellhead bowl wherein the wing valve conduit flange is secured by a weld bead that extends into the interior of the conduit;

FIG. 14 is a partially cutaway elevation view of the reaming tool attached to the manipulator of the wing valve tool with portions of the reaming tool removed for clarity; and FIG. 15 is a cross-sectional elevation view of the wing valve conduit and the adjoining portion of the wellhead, and a portion of the wing valve with the manipulator extending through the wing valve and the reaming tool located in the conduit.

Figure 1:
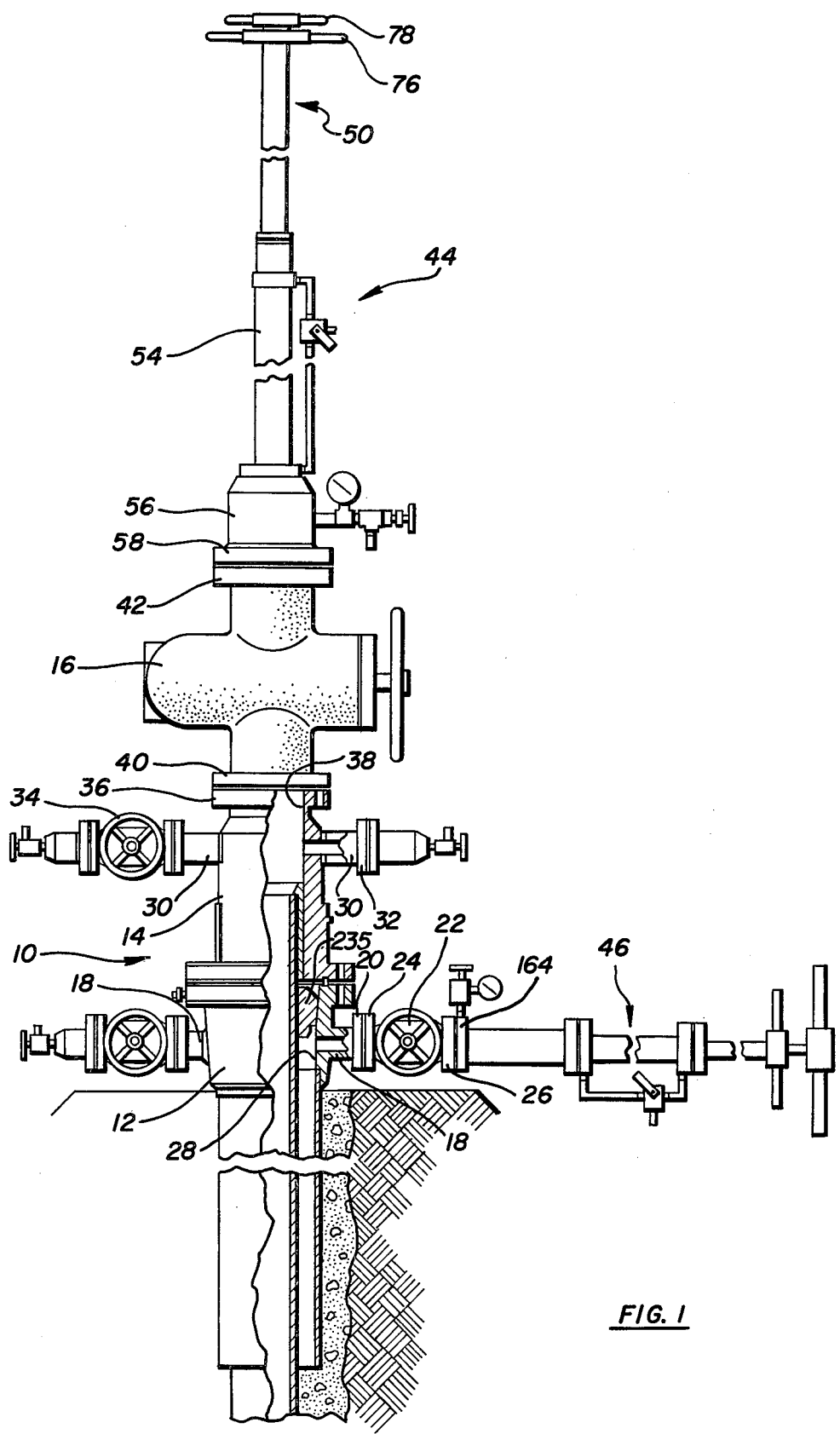
FIG. 1 is an elevation view of a wellhead assembly and the upper portion of the well casing which extends through the ground with portions of the wellhead assembly removed for clarity wherein one embodiment of the tool is mounted on a wing valve at the casing head bowl and another embodiment of the tool is mounted on the master valve.

The following is a discussion and description of preferred specific embodiments of the valve removal and replacing tool of this invention, with such description made with reference to the drawings whereupon the same reference numerals are used to indicate the same or similar parts and/or structure. It is to be understood that such discussion and description is not to unduly limit the scope of this invention.

DETAILED DESCRIPTION

FIG. 1 shows both embodiments of the valve removal and replacing tool of this invention mounted on an operative wellhead assembly indicated generally at 10. Wellhead assembly 10 has a bowl 12 which is secured to the well casing that extends through the ground. A spool 14 is mounted on top of the bowl and a master valve 16 is mounted on top of the spool. Wellhead bowl 12 is provided with auxiliary outlets on the sides thereof. Each of the auxiliary outlets are formed by a wing valve conduit 18 extending outward from the bowl and having a fluid coupling flange 20 on the outer end thereof for mounting a wing valve 22. Wing valve 22 is provided with fluid coupling flanges 24 and 26 on the inlet and outlet thereof for mounting with wing valve conduit flange 20 on bowl 12 and connecting with other portions of the wellhead system. The interior of bowl 12 is provided with a relatively smooth and cross-sectionally circular interior surface 28. Spool 14 also has a pair of auxiliary outlets with each outlet having a conduit 30 and an attached outlet flange 32 for mounting spool outlet valves 34. The upper portion of spool 14 has an outlet flange 36 for connection with master valve 16. The interior of spool 14 has a cylindrical bore 38 which is intersected by the bores of two spool auxiliary outlet conduits 30. Master valve 16 is provided with inlet and outlet flanges 40 and 42 with the inlet flange connected to the spool outlet flange 36. Master valve outlet flange 42 is connected to a second master valve in some installations and in other installations it joins other portions of the wellhead completion system.

Wellhead assembly 10 is shown with both embodiments of the tool of this invention. The master valve tool indicated generally at 44 is shown mounted with master valve 16 and the wing valve tool indicated generally at 46, is shown mounted with wing valve 22 on bowl 12. Both tools are very structurally similar with master valve tool 44 being physically larger to accommodate the larger bore diameter of the master valve.

FIGS. 2 through 9 inclusive illustrate master valve tool 44 and the several elements thereof in detail. Master valve tool 44 includes a housing which encloses manipulator 50 and a packing and latching assembly indicated generally at 52. Manipulator 50 forms an operating mechanism and packing assembly 52 forms a sealing and latching mechanism which is releasably connected to the operating mechanism. The housing is comprised of an elongated cylindrically shaped portion 54 with a radially enlarged portion 56 at one end thereof. Housing enlarged portion 56 has a flange 58 on the exposed end thereof for mounting with the master valve outlet flange 42. Housing portion 54 serves as the cylinder portion of a piston and cylinder arrangement used to displace manipulator 50.

Manipulator 50 includes an outer elongated cylindrical member 60 and an inner rodlike member 62. A piston 64 is mounted around the exterior of manipulator outer member 60 and located within elongated housing portion 54. A piston and cylinder are formed by housing portion 54, piston 64, and manipulator outer member 60. A pair of seals 66 are located at the juncture of housing portions 54 and 56 to seal around one end of the piston rod formed by manipulator outer member 60. Another annular seal 68 is positioned in the outer end of elongated housing portion 54 to seal around the opposite end of manipulator outer member 60. Passageways 70 and 72 through opposite end portions of elongated housing portion 54 provide fluid communication to opposite sides of piston 64. Conduits connect passageways 70 and 72 to a control or switching valve 74 which functions to alternately supply and drain fluid pressure from the chambers on the opposite sides of piston 64 for extending and retracting manipulator 50. Outer and inner manipulator members 60 and 62 are each respectively provided with operating handles 76 and 78 to be used by a service technician for manually operating the tool. An annular seal 80 is provided between the inner and outer manipulator members 60 and 62 to prevent the passage of fluid from the tool between these members.

Enlarged housing portion 56 is a generally bell shaped housing having an internal wall 82 of sufficient diameter and length to receive and enclose packing assembly 52 when it is in the retracted position. A passageway 84 through enlarged housing side wall 82 provides fluid communication to a pressure gauge 86 and a manually operable relief valve 88. When the tool is in use the pressure gauge is used by the technician to determine presence of fluid pressure in the tool housing. Relief valve 88 is also used to test the sealing integrity of the packing assembly and relieve fluid pressure in the housing. Flange 58 is used to securely couple the tool to the outlet flange of the valve which is to be removed or installed as the case may be.

Packing and latching assembly 52 is shown in detail in FIGS. 7, 8, and 9 and includes a packing mechanism to pack or seal fluid in the conduit and a latching mechanism to latch or secure the packing mechanism or assembly in the wellhead. A packing assembly body member 90 has a body end member 92 positioned on one end thereof with a packing ring 94 disposed between facing abutments of the body end member and the body. On an inner end of packing assembly body 90, a pair of latch members 96 and 98 are mounted to extend in a direction transverse to the flow passage that is to be sealed. A body end cover 100 is removably mounted on the inner end of body 90 to cover the latch mechanism.

The packing portion of packing assembly 52 is operated by outer manipulator member 60. FIG. 7 is split through the packing portion thereof with the upper portion of the figure and the latch mechanism illustrating the packing in a radially expanded or energized condition and the lower portion of the figure illustrating the packing in a relaxed or constracted condition. Body end member 92 is shaped somewhat like a cap to fit over the outer end of body member 90 and to retain packing ring 94. Interior of body end member 92 and body member 90 are joined by a connector member 102 which has a dual diameter exterior with coarse threads on the larger diameter outer end portion and finer threads on the smaller diameter inner end portion. The interior of body end member 92 has a larger diameter than the interior of body member 90. The interior of body end member 92 is provided with a relatively coarse threaded portion 104 to mate with the correspondingly sized coarse threaded portion 106 of connector member 102. The interior of body member 90 is provided with a relatively fine threaded portion 108 which mates with a relatively fine threaded exterior inner end portion 110 of connector member 102. Rotation of connector member 102 in either direction will displace body end member 92 a greater distance lengthwise on connector member 102 than connector member 102 will be displaced relative to body member 90. For a given rotation of connector member 102 body end member 92 will be displaced a distance relative to body member 90, which is greater than the distance which connector member will be displaced relative to body member 90. The relative displacement between body end member 92 and connector member 102 is used to change the longitudinal dimension of packing 94. Changing the longitudinal dimension of packing 94 causes it to radially expand and contract for sealing in the wellhead. The interior of connector member 102 is provided with a spline that has a plurality of alternating large diameter segments 112 and smal diameter segments 114 as shown in FIG. 9. The exterior of manipulator outer member 60 is provided with a correspondingly splined end portion having alternating small diameter segments 116 and large diameter segments 118 as shown in FIG. 5 to correspondingly engage the interior of connector member 102. A plurality of bolts or fasteners 120 extend through body end member 92 into body member 90 to limit the outward movement of body end member 92 from the body member.

The latching portion of packing assembly 52 is located at what is referred to as the inner end portion of body member 90. The latching assembly or mechanism includes a hub 122 rotatably mounted in a bore through the longitudinal axis of body member 90. The interior of the hub is shaped to receive the end portion of manipulator inner member 62. The outer perimeter of the hub is connected to latch members 96. Body member 90 has a central opening joining the bore in which connector member 102 is located with the bore in which hub 122 is located. This opening is a fluted or splined opening having alternating small diameter segments 124 and larger diameter segments 126. This central opening is shaped to match the inner end of inner manipulator member 62 such that the inner manipulator member must be aligned properly before it can be passed through the opening. The interior of hub 126 is shaped like the central opening with small diameter segments 128 and larger diameter segments 130. This portion of the structure is designed so the latch members must be fully extended in order for the manipulator member to be inserted into or removed from the hub. Latch members 96 and 98 are joined by connecting rods 132 and 134 to the opposite sides of hub 122. Wrist pins through latch members 96 and 98 pivotally join the associated connecting rods 132 and 134. Connecting rods 132 and 134 are pivotally mounted to hub 122 by support pins 136 and 138 on opposite sides of hub 122. Rotation of hub 122 will cause latch members 196 and 198 to move inward and outward in a coordinated retracting and extending motion.

FIG. 8 shows latch members 96 and 98 in solid lines in an extended position. Latch member 96 is a cylindrical plunger like member having a radially enlarged lip 140 on the inner end portion thereof. The bore in which latch member 96 is mounted is formed in a dual diameter configuration with a smaller diameter portion 142 on the outer portion thereof joined by a radially disposed abutment 144 to a larger diameter portion 146. Latch member 96 moves longitudinally through bores 142 and 146 with lip 140 contacting abutment 144 to limit the outward movement of the latch member. Latch member 98 and the associated bore in which it resides are constructed the same as latch member 96. As shown in FIG. 8 when latch members 96 and 98 are in their outermost position connecting rods 132 and 134 are not positioned with their longitudinal axes in line. This construction is selected to prevent the latch members from becoming locked in an extended position. With hub 122 in the position shown in FIG. 8, the larger and smaller diameter hub segments 130 and 128 align with the body central opening segments 126 and 124. It is to be noted that only when the latches are fully extended does the opening in the hub line up with the body central opening to permit insertion or removal of the manipulator inner member from hub 122. This feature of this invention is important as a safety precaution to prevent the manipulator from being removed from the packing assembly at any time except when the latches are fully extended.

FIGS. 1-4 illustrate this master valve embodiment of the valve removal tool in use. Prior to attaching the tool to the valve, packing assembly 52 is mounted with manipulator 50 and positioned inside housing 56 as shown in FIG. 2. Once this has been done then housing 56 is mounted with the valve. The valve outlet flange 42 is coupled to the housing flange 58 and the tool is secured in the fluid-tight relation to the valve outlet by suitable fasteners through the flanges. Next, the master valve is opened so that the packing assembly 52 can pass through the bore of the valve. The piston and cylinder arrangement on manipulator 50 is used to extend the manipulator and thereby displace packing assembly 52 through the valve. In order to do this, control or switching valve 74 is connected to a fluid pressure source and to a fluid sump and then shifted so that fluid pressure is applied through passageway 70 to the outer side of piston 64 and fluid pressure is vented from the cylinder port 72. The application of fluid pressure can be done by any convenient means such as a hand operated pump, a powered pump or the like. Although it is possible to displace manipulator 50 through valve 16 by hand, the piston and cylinder arrangement provides an easy means of overcoming fluid resistance in the valve while also providing a simple position control for the packing assembly within the valve and wellhead.

Packing assembly 52 is inserted through valve 16 and into the upper portion of the wellhead until latch members 96 and 98 can be extended. Extending the latch members is done by manually holding manipulator handle 76 and turning manipulator handle 78 in the direction which will cause extension of the latch members. Inner manipulator handle 78 is turned to its limit of travel which is governed by the lips on latch members 96 and 98 contacting abutments 144 in the body member which positions the latch members as shown in FIG. 3 and FIG. 8. At this time the packing assembly is secured by the latches and the packing can be expanded. Expanding of packing 94 is done by rotating outer manipulator member handle 76 which in turn rotates connector member 102 in packing assembly and displaces body end 92 over the end portion of the packing assembly body 90 thereby causing packing ring 94 to be expanded radially outwardly into fluid-tight sealing relation with the wellhead bore 38. At this point the packing assembly is set in the wellhead and the manipulator is withdrawn from the packing assembly by reversing switching valve 74 and applying fluid through port 72 to the inner side of piston 64. When the manipulator has been withdrawn then fluid pressure within the tool housing is vented by relief valve 88 so master valve 16 and the master valve tool 44 can be removed from the wellhead as shown in FIG. 4.

Once the valve and the tool have been removed from the wellhead, the master valve is removed from the master valve tool for repair or disposal. In any event another valve is again mounted with the master valve tool and the tool positioned as shown in FIG. 4 whereupon the valve inlet flange and the wellhead outlet spool flange 36 are connected. When this is done manipulator 50 is extended so the inner end thereof can be inserted into packing assembly 52. Both of the manipulator members are rotated so the splined ends of the outer member can be engaged with connector member 102, and the inner manipulator member passed through the central opening in valve body 90 into hub 122. The inner end of inner manipulator member 62 slips through the central opening of body member 90 and into the opening of hub 122. Once the manipulator is again engaged with packing assembly 52 the outer manipulator member handle 76 is rotated to displace connector member 102 outwardly or away from hub 122 thereby releasing the packing. Pressure gauge 86 provides an indicator for the technician to determine when fluid pressure from the wellhead is present in the valve and the tool housing. When wellhead pressure is present in the valve and the tool housing then the latch members can be retracted. If desired to assist in retracting the latch members, the packing assembly 52 can be displaced slightly further into the wellhead from the position shown in FIG. 3 so that latch members will not drag on the conduits as they are retracted into body member 90. Once this has been done, manipulator handle 76 is held in place manually and handle 78 is rotated to its opposite extreme thereby retracting latch members 96 and 98 into body member 90. When the latch members have been retracted, then the manipulator including the packing assembly is retracted into tool housing 56 as shown in FIG. 2 whereupon valve 16 can be closed to seal fluid flow from the wellhead in the normal manner. Relief valve 88 on housing 56 can be used to check the sealing integrity of master valve 16. Opening relief valve 88 releases fluid pressure from the valve outlet side and from the tool housing. If the new valve leaks fluid will continue to flow from relief valve 88. Valve 88 also provides a port for venting fluid from housing 56 prior to disconnecting flanges 42 and 58 for removal of the master valve tool. Once fluid has been vented from housing 56 then master valve tool 44 is removed from the master valve so the wellhead can be again put into service by connecting flowlines, etc. to master valve 16.

FIGS. 10, 11, and 12 show the wing valve tool embodiment of this invention with this tool indicated generally at 46. Wing valve tool 46 is a smaller size construction than master valve tool 44 and designed to remove the auxiliary or wing valves from the side of a wellhead assembly or the like. Basically, the two embodiments of the tool of this invention are similar with the wing valve tool 46 being physically smaller. The housing portion of wing valve tool 46 includes an elongated cylindrical portion 150 enclosing a portion of the manipulator and an attached enlarged housing portion 152. Enlarged housing portion 152 forms an enclosure for the packing assembly which is indicated generally at 154. The manipulator indicated generally at 156 extends through housing portion 150 and can be positioned to extend through housing portion 154. Housing cylinder portion 150 is an elongated tubular member with flanges 158 and 160 on the opposite ends thereof. A housing end member 161 is mounted on the outer end of elongated cylinder housing portion 150 and secured to flange 158. Enlarged housing portion 152 is also an elongated generally cylindrical member having a flange 162 on its outer end to mount with flange 160 of cylindrical housing portion 150. The inner end of enlarged housing portion 152 is provided with a flanged coupling 164 of the type compatible with typical flange couplings on wellhead valves. Flange 164 has a passageway through one side thereof for mounting a relief valve 168 and a pressure gauge 170. Manipulator 156 includes a cylindrical outer manipulator member 172 which encloses a major center portion of a rodlike manipulator member 174. Manipulator outer member 172 has an enlarged piston portion 176 in a mid-portion thereof.

Piston 176 is located inside housing portion 150 and provided with a pair of seals 178 around the outer perimeter thereof which seal in the bore 180 of cylindrical housing portion 150. A pair of seals 182 and 184 are provided in housing ends 161 and 162 respectively to seal opposite ends of the cylinder formed by cylindrical housing portion 150. Flanges 158 and 160 are provided with passageways 186 and 188 respectively through one side thereof to supply fluid under pressure to opposite ends of piston 176 in cylindrical housing portion 150. A three-way fluid control or switching valve 190 is connected by conduits to passageways 186 and 188. The switching valve 190 is connected to a fluid pressure source so that fluid under pressure can be directed to either side of piston 176 to move manipulator 156 between extended and rectracted positions.

Manipulator 156 is movable between a retracted position shown in FIG. 10 and an extended position shown in FIG. 11. Inner manipulator member 174 has an operating handle 192 on the outer end thereof. The outer end portion of inner manipulator member is threadedly mounted with the outer end portion of outer manipulator member 172. A pin 194 is mounted transverse to the elongated axis of inner manipulator member 174 through its opposite end. Pin 194 is mounted transversely through the inner end of manipulator member 174 and extends outwardly from both sides of the manipulator member. A peripheral seal 196 around a mid-portion of inner manipulator member 174 provides a fluid-tight seal between the manipulator members 172 and 174. Outer manipulator member 172 has an operating handle 198 on the outer end thereof and a pair of longitudinally oriented slots 200 on the inner end thereof. Slots 200 are disposed longitudinally on opposite sides of the member so they can extend around a pair of diametrically opposed pins in packing assembly 154.

Packing assembly 154 includes a hollow cylindrical body member 202, on annular packing 204 at one end of body member 202, and a flange around a hollow body inner member 206 at the inner end of packing 204 and extending longitudinally outward through the annulus of packing 204 into body member 202. Body member 202 is provided with a large diameter inside portion at its outer end portion and a pair of diametrically opposed pins 208 extending transversely relative to the body and into the cavity of the body. A pair of key members 209 are mounted in keyways between body member 202 and body inner member 206 to prevent relative rotation between the members. An inwardly extending shoulder 210 is formed by the ends of key 209. An elongated threaded connector 212 extends through the central portion of body member 202 and has an enlarged head 214 located in the outer portion of the body member with one side resting on shoulders 210. The interior opening of body inner end member 206 is threaded and mounted with connector 212. Connector 212 is threaded in a mid-portion thereof to engage the threaded interior of body end member 206. An annular seal 216 is provided in the interior of body end portion 206 to seal around connector 212. A disc like latch positioner 218 is attached to the inner end portion of connector 212.

The inner end portion of body member 206 is notched on the opposed sides thereof to receive and mount the radially movable latch members. The tool shown in FIGS. 10-12 is provided with a pair of identical latch members which are both indicated at 220. Latch members 220 are positioned on opposite sides of connector 212 and pivotally mounted with body portion 206 by mounting pins 222. The identical latch members each have an inwardly extending lug 224 on the interior side of the outer end portion thereof. Lug 224 is disposed outwardly of latch positioner 218. The inner end portion of each latch member 220 has an inwardly extending lug 226 on the inner side thereof at the innermost end portion of the latch member. A shoulder 228 is formed on the outer side of each latch member 220 at a position spaced from the inner end of the latch. Shoulder 228 is generally transverse to the longitudinal axis of the latch. Lugs 224 and 226 are contacted by latch positioner 218 to limit the motion of connector 212 and to displace latch members 220 between retracted and extended positions. Shoulder 228 engages the interior surface 28 of wellhead bowl 12 when the packing assembly is secured as shown in FIG. 11. As connector 212 is rotated to be displaced inwardly or to the right from the position shown in FIG. 10 the outer perimeter of latch positioner 218 moves over the inside surfaces of latch members 220 thereby displacing them outwardly relative to the longitudinal axis of the tool. As this occurs when the packing assembly is positioned in the wellhead as shown in FIG. 10, it causes shoulder 228 to be displaced over the portion of surface 28 which is immediately adjacent bore 232 of conduit 30. It is to be noted that latch members 220 are so dimensioned as to be inserted into the space between interior bowl surface 28 and the exterior surface 234 of wellhead inner member 235. In typical common wellhead designs the space between surfaces 28 and 234 is relatively small, for example, it is typically on the order of two (2) inches or less.

Outer end portion 214 of connector 212 is shaped to receive and engage the inner end portion of manipulator inner member 174. Connector 212 is hollow in its center portion and provided with a pair of oppositely extending generally L-shaped slots on each side thereof. One of the L-shaped slots is shown in FIGS. 10-12 and indicated at 236. Pin 194 on inner manipulator member 174 engages both slots on opposite sides of connector outer end portion 214 with the rodlike portion of inner manipulator member 174 resting in the outer end hollow center portion. These slots function to couple the manipulator to connector 212.

In using wing valve tool 46 it is mounted with one of the wing valves on the wellhead as shown in FIG. 1 with tool flange 164 being secured to valve outlet flange 26. Initially wing valve 22 has the valve member thereof 238 in the closed position so that fluid flow is blocked through the valve. To begin using wing valve tool 46 the valve member is moved to the open position so packing assembly 154 can be inserted through the bore of the valve and into the wing valve conduit of the wellhead. Inserting packing assembly 154 through the wing valve is done by positioning switching valve 190 to apply fluid pressure to the outer side of piston 176 and vent the inner side of the piston so the manipulator members and packing assembly 154 are displaced through the valve. When the packing assembly 154 reaches the approximate position shown in FIG. 11, then the manipulator outer member handle 198 is manually held in a fixed position while handle 192 is rotated. Rotating handle 192 displaces inner manipulator member 174 in an inward direction through outer manipulator member 172 by virtue of the external threads on the inner member 174 and internal threads in handle portion 198. Additionally, rotating manipulator inner member 174 rotates connector 212 and this displaces latch positioner 218 inwardly thereby causing latch members 220 to be displaced or moved radially outwardly so that shoulders 228 engage bowl inside surface 28. As connector 212 is rotated this causes body end member 206 to be displaced toward body member 202 which compresses packing ring 204 between the body member and the body end member thereby radially outwardly expanding the packing into fluid-tight sealing engagement with wing valve conduit bore 232. Lugs 226 on the innermost end of latch members 220 will function as a stop to limit the movement of latch positioner 218. It may not be necessary to rotate connector 212 so that latch positioner 218 is in contact with lugs 226 because packing 204 may sufficiently seal without the necessity of compressing it completely thus locating latch positioner 218 in a spaced relation to lugs 226. Once the seal in wing valve conduit 18 has been established, then wing valve tool 46 and wing valve 22 can be removed together from wellhead flange 20. In order to release the manipulator from the packing assembly, inner manipulator member handle 192 is rotated such that pin 194 can be removed from L-shaped slot 236 in connector head 214. When this is done the manipulator can be retracted from the position shown in FIG. 11 so the valve and the tool can be easily removed from the wing valve conduit without disturbing the sealed packing assembly. In removing the valve from the conduit the bolts which fasten flanges 20 and 24 together can be loosened thereby releasing fluid pressure trapped within the tool and the valve. After this the valve is completely removed from the wing valve conduit.

Installing a replacement valve on the wellhead is done after the old or used wing valve has been removed from the wing valve tool. The replacement wing valve is attached to the tool in the same fashion as the other valve which was previously removed from the tool. When the wing valve tool is disconnected from packing assembly 154 care should be taken to keep the handles 192 and 198 in substantially the same relative position to each other so that when the manipulator is extended to the packing assembly then slots 200 and pin 194 will easily engage packing assembly 154. If the slots 200 do not immediately line up with pins 208 the manipulator members should be rotated until the slots line up and then the manipulator members extended together in order to place pin 194 in L-shaped slot 236. Once the replacement valve flange has been connected to wellhead flange 20 and the manipulator engaged with the packing assembly, then manipulator inner member handle 192 is rotated to cause manipulator member 174 to be moved in an outward direction from outer manipulator member 172. This movement displaces connector 212 outward from the wellhead and releases the longitudinal compression on packing 204 thereby releasing its fluid-tight seal in wing valve conduit 18. Also, at the same time latch positioner 218 is moved into contact with latch outer lugs 224 and this causes the latch members 220 to be rotated about pins 222 thereby pulling shoulders 228 from engagement with the wellhead interior surface 28. Pressure gauge 170 on the tool will provide an indication of when packing 204 has released the fluid-tight seal because pressure in the tool housing will increase. Once latch members 220 are in the fully retracted position as shown in FIG. 10, then manipulator 156 can be retracted by applying fluid pressure to the side of piston 176 that is closest to the wellhead. Once packing assembly 154 is in the position shown in FIG. 10, then the replacement valve can be closed to seal the fluid in the wellhead. When the replacement valve is closed the valve removal tool can be detached from the replacement wing valve to complete the replacement procedure. Once the valve removal tool has been removed from the wing valve, then the wing valve can be reconnected to the wellhead flowline system as it was before the original valve was removed.

FIGS. 13, 14, and 15 illustrate a reamer which can be used with the valve removal tool of this invention to prepare a wing valve conduit or the like prior to using the tool with the packing assembly to remove a valve. The problem which necessitates the use of a reamer prior to using the tool with the packing assembly is illustrated in FIG. 13. FIG. 13 shows a portion of a wellhead bowl 240 and the attached wing valve outlet conduit 242 and wing valve flange 244. The bore 246 of wing valve conduit 242 and the bore 248 of flange 244 are substantially coaxial and of approximately the same diameter. Flange 244 is joined to conduit 242 by a weld indicated at 250. This weld 250 is made from the interior of the conduit thus forming a resultant weld bead 252 which extends into the bore defined by the conduit and the flange. Weld bead 52 in its smallest diameter portion is substantially smaller than the bore of the conduit and the flange thereby creating an obstruction to any object which might be inserted into the conduit such as the packing assembly used with the valve removal tool. At this point it is to be stressed that not all wellheads are constructed with the flanges attached in this manner, however, those which are constructed with such a welded flange require the bores to be smoothed by removing weld bead 252 before the valve removal tool can be used.

The reamer is shown in FIG. 14 mounted with the manipulator of the wing valve removal tool. The reamer has a body 254 which is hollow on an outer end portion 256 for mounting with the manipulator. The reamer has a plurality of cutters 258 mounted around the exterior thereof. Cutters 258 extend over the mid-portion of the reamer and terminate at an inner end thereof. Hollow body portion 256 is provided with a pair of inwardly extending pins 259 which engage slots 200 in manipulator outer member 172. A cross-sectionally L-shaped slot 260 is provided on each side of the interior of hollow body portion 256 to engage manipulator inner member pin 194. Cutters 258 comprise a plurality of elongated cutting elements mounted around the outer periphery of body 254 and align with the longitudinal axis of the manipulator and shaped on their outer surface to cut a cross-sectionally circular bore. Cutters 258 as shown are tapered with the inner end of the reamer defining a relatively small diameter and the outer end of the reamer defining a larger diameter. It is to be understood that shapes and arrangements of cutters which are different from that shown can be used. Regardless of the shape of the cutters they must be shaped to smooth the interior bore of wing valve conduit sufficiently to permit passage of the packing assembly.

FIG. 15 shows the reamer in use in the wellhead. The reamer is connected with the wing valve tool and inserted through wing valve 22 in the same manner as the packing assembly. When cutters 258 contact weld bead 252, then the manipulator outer handle 198 is rotated to turn the reamer thereby cutting the weld bead and smoothing the passageway through the wing valve conduit. The reamer is rotated and inserted into the conduit in a simultaneous fashion to cut weld bead 252. The reamer can be inserted until the inner end thereof contacts the wellhead inner member 262, then it is withdrawn from the wing valve conduit. When the reamer is fully inserted and has been rotated to cut away weld bead 252, then the interior of the wing valve conduit and the flange are sufficiently enlarged and smoothed so the conduit will admit the packing assembly. After the reaming operation is finished the manipulator is retracted to position the reamer in the tool housing and then wing valve 22 is closed to contain fluid pressure in the wellhead. After the valve is closed the wing valve tool is removed from the valve, then the reamer removed from the manipulator and replaced by the packing assembly. From this point the wing valve tool is used as described above so the wing valve can be removed and replaced.

In the use and operation of the several embodiments of the valve removal tool of this invention, it is seen from the above description that this tool provides a simple and safe means of removing valves from an operating wellhead. The two embodiments of the valve removal tool function similarly in that a housing is attached to the valve which is to be removed and the packing assembly is operated by a manipulator that is inserted through the valve and secured in the wellhead to temporarily block the fluid flow. In each of the embodiments connection between the manipulator and the packing assembly provides a positive control of the packing and latching functions of the packing assembly to insure safe operation of the tool. These safety features are extremely important when using the tool on high pressure oil wells and geothermal wells. The reamer is an auxiliary device usable with the wing valve tool to prepare the wing valve conduit for the packing assembly. The reamer is needed before the valve removal tool can be used on wellheads where a weld bead or similar obstruction extends into the flow conduit.

What is claimed is:

1. A tool adapted to be positioned against the outlet end of a valve on an operating wellhead assembly under pressure for removing and replacing the valve with the tool being in longitudinal alignment with the flowline in which the valve is positioned;

said tool having an outer elongated housing carrying a sealing and latching mechanism and an operating mechanism releasably connected to the sealing and latching mechanism;

said sealing and latching mechanism adapted to be positioned in the flowline upstream of the inlet end of the valve and having an outwardly movable latch member for holding the sealing and latching mechanism in a fixed position within the flowline upstream of the valve, said sealing and latching mechanism having a radially expanding elastomeric sealing element adjacent the latch member for engaging the inner circumference of the flowline in a fluid-tight sealing relation upstream of the inlet end of the valve to be removed;

said operating mechanism being manually operated through the housing adjacent the valve to be removed and operatively connected to the sealing and latching mechanism for selectively expanding the sealing element outwardly into sealing engagement with the flowline and for selectively moving the latch member outwardly for retaining the sealing and latching mechanism in fixed position within the flowline, said operating mechanism being released from said sealing and latching mechanism after actuation of said sealing and latching mechanism to permit removal of the valve;

said sealing and latching mechanism including a hollow generally cylindrical body member, a body end member longitudinally slidably mounted with said body member at one end portion thereof, a threaded connector member inside the body member and threadedly mounted with the body end member, and the sealing element comprises a packing ring mounted between a peripheral abutment around said body member and a peripheral abutment around said body end member, said connector member being operable upon rotation in one direction by said operating mechanism to move said body end member toward said body member thereby longitudinally compressing and radially expanding said packing ring, said connector member being operable upon rotation in the opposite direction by said operating mechanism to move said body end member away from said body member thereby releasing said packing ring; and said sealing and latching mechanism including a plurality of radially movable latch members mounted with said body member, and a latch displacing member mounted on said connector member to move said latch members radially outwardly upon movement of said connector member to compress said packing ring to latch said sealing and latching mechanism in said flowline.

2. The tool of claim 1 wherein said sealing and latching mechanism has a generally cylindrical body member with the sealing element comprising a resilient annular packing around the body member and a packing expander mounted on said body member actuated by said operating mechanism to expand and release said packing;

said sealing and latching mechanism including a plurality of radially outwardly movable latch members mounted with said body member and actuated by said operating mechanism, said latch members being movable between extended and retracted positions with said latch members individually engaging said wellhead assembly when in the extended position.

3. The tool of claim 1 wherein said operating mechanism comprises an inner actuating member operatively connected to the sealing element for selectively expanding the sealing element into fluid-tight sealing relation with the flowline and an outer actuating member operatively connected to the latch member for selectively actuating the latch member independent of the sealing element.

4. The tool of claim 1 wherein said inner actuating member is received within said outer actuating member and both actuating members extend from the outer end of the elongated housing, and a manual operator is positioned adjacent the end of each actuating member for manual operation thereof.

5. A tool adapted to be positioned against the outlet end of a valve on an operating wellhead assembly under pressure for removing and replacing the valve with the tool being in longitudinal alignment with the flowline in which the valve is positioned;

said tool having an outer elongated housing carrying a sealing and latching mechanism and an operating mechanism releasably connected to the sealing and latching mechanism;

said sealing and latching mechanism adapted to be positioned in the flowline upstream of the inlet end of the valve and having an outwardly movable latch member for holding the sealing and latching mechanism in a fixed position within the flowline upstream of the valve, said sealing and latching mechanism having a radially expanding elastomeric sealing element adjacent the latch member for engaging the inner circumference of the flowline in a fluid-tight sealing relation upstream of the inlet end of the valve to be removed;

said operating mechanism being manually operated through the housing adjacent the valve to be removed and operatively connected to the sealing and latching mechanism for selectively expanding the sealing element outwardly into sealing engagement with the flowline and for selectively moving the latch member outwardly for retaining the sealing and latching mechanism in fixed position within the flowline, said operating mechanism being released from said sealing and latching mechanism after actuation of said sealing and latching mechanism to permit removal of the valve;

said operating mechanism having an outer actuating member operatively connected to the sealing element for selectively expanding the sealing element into fluid-tight sealing relation with the flowline and an inner actuating member operatively connected to the latch member for selectively actuating the latch member independently of the sealing element;

said housing having a portion thereof enclosing an intermediate portion of the outer actuating member and forming a fluid cylinder around said intermediate portion, said outer actuating member having a piston secured thereto within said cylinder; and means to apply fluid pressure to opposite sides of said piston for moving said outer actuating member between extended and retracted positions.

6. A tool adapted to be positioned against the outlet end of a valve on an operating wellhead assembly under pressure for removing and replacing the valve with the tool being in longitudinal alignment with the flowline in which the valve is positioned and in transverse alignment to a connecting passageway;

said tool having an outer elongated housing carrying a generally cylindrical head having an annular sealing means and an independent latching means, and an operating mechanism releasably connected to the sealing means and latching means for operation of the sealing means and latching means;

said cylindrical head adapted to be positioned in the flowline upstream of the inlet end of the valve adjacent the connecting passageway and having an outwardly movable latch member adapted to extend into the connecting passageway for holding the head in a fixed position within the flowline upstream of the valve, said sealing means having a radially expanding elastomeric packing ring downstream of the latch member for engaging the inner circumference of the flowline in a fluid-tight sealing relation upstream of the inlet end of the valve to be removed;

said operating mechanism being operated through the housing adjacent the valve to be removed and having a manual operator operatively connected to the sealing means and the latching means for selectively expanding the packing ring outwardly into sealing engagement with the flowline and for selectively moving the latch member outwardly into the connecting passageway for retaining the head in fixed position within the flowline, said operating mechanism being selectively removable from said sealing means and latching means after actuation thereof to permit removal of the valve;

said operating mechanism having an outer actuating member operatively connected to the sealing element for selectively expanding the sealing element into fluid-tight sealing relation with the flowline and an inner actuating member operatively connected to the latch member for selectively actuating the latch member independently of the sealing element, said actuating members having said manual operators thereon;

said housing having a portion thereof enclosing an intermediate portion of the outer actuating member and forming a fluid cylinder around said intermediate portion, said outer actuating member having a piston secured thereto within said cylinder; and means to apply fluid pressure to opposite sides of said piston for moving said outer actuating member between extended and retracted positions.

7. The tool of claim 6, wherein:

said head includes a hollow generally cylindrical body member, a body end member longitudinally slidably mounted with said body member at one end portion thereof, a threaded connector member inside the body member and threadedly mounted with the body end member, said body member and said body end member having facing abutments with a packing ring sandwiched therebetween, said connector member being operable upon rotation in one direction by said operating mechanism to move said body end member toward said body member thereby radially expanding said packing ring, said connector member being operable upon rotation in the opposite direction by said operating mechanism to move said body end member away from said body member thereby releasing said packing ring.

8. A tool for removing and replacing a valve on an operating wellhead assembly having a housing defining a pressurized chamber, a conduit mounted with the housing and in fluid communication with the pressurized chamber, a fluid coupling on the conduit, and a valve having inlet and outlet fluid couplings with one fluid coupling mounted on the conduit fluid coupling such that the valve is in fluid communication with the pressurized chamber, wherein the tool comprises:

an elongated housing having a fluid coupling on one end for engaging a fluid coupling of said valve;

packing means for mounting in said conduit to temporarily block fluid flow through said conduit;

latch means associated with said packing means to temporarily secure said packing means with said wellhead assembly;

manipulator means carried by said housing and removably connected to said packing means to displace said packing means through said valve and into said conduit to expand and release said packing means, and to selectively engage and release said latch means;

said packing means having a hollow cylindrical body member with a resilient annular packing around a mid-portion thereof and a body end member movably mounted on an outer end of said body member, said body end member being engagable by said manipulator means and movable to compress said packing between an abutment on said body member and another abutment on said body end member to radially expand said packing; and said latch means having a hub rotatably mounted in said body member and operably connected to a pair of oppositely disposed latch members with said hub being engagable by said manipulator means and rotatable to displace said latch members between extended and retracted positions.

9. The tool of claim 8, wherein:

said packing means includes a threaded connector member inside the body member and threadedly mounted with the body end member, said connector member being operable upon rotation in one direction to move said body end member toward said body member thereby longitudinally compressing and radially expanding said packing, said connector member being operable upon rotation in the opposite direction to move said body end member away from said body member thereby releasing said packing; and said latch means includes a latch displacing member mounted on said connector member to move said latch members radially outwardly to the extended position upon movement of said connector member in the direction to longitudinally compress said packing to latch said packing means in said conduit and said latch displacing member also being operable upon movement of said connector member in the direction to release said packing to retract said latch members for releasing said packing means from said conduit.

10. The tool of claim 9, wherein:

said body end member and said body member are joined by a hollow externally threaded coupling wherein said coupling has a relatively coarse threaded portion engaged in said body end member and a relatively fine threaded portion engaged in said body end member with the interior of said coupling being engaged by said manipulator means such that rotation of said manipulator means in one direction will move said body end member toward said body member thereby longitudinally compressing and radially expanding said packing and such that rotation of said manipulator means and said connector member in the opposite direction will move said body end member away from said body member thereby releasing compression of said packing;

said manipulator means has an inner manipulator member and an independently rotatable outer manipulator member around said inner manipulator member;

said body having a central opening adjacent said hub to pass said inner manipulator member to said hub;

said inner manipulator member, said hub, and said body central opening being cooperatively splined such that said inner manipulator member can only be engaged with and disengaged from said hub when said latch members are in the fully extended and fully retracted positions.

11. The tool of claim 8, wherein:

said cylindrical body has an internally threaded end outer end portion and a radially disposed abutment around said outer end portion, said body end member is internally threaded and longitudinally mounted on said outer end portion of said body, said packing means includes an externally threaded connector joining said body and said body end member and rotatable to move said body end member toward said radially disposed abutment, said packing includes a packing ring around said body and between said body end member and said radially disposed abutment; and said latch means includes a plurality of connecting rods pivotally mounted on said hub and said latch members such that rotation of said hub extends and retracts said latch members.

12. The tool of claim 11, wherein:

said manipulator means has an inner manipulator member and an independently rotatable outer manipulator member around said inner manipulator member with said manipulator members being threadedly joined at an outer end portion;

said inner manipulator member has an inner end extending beyond an inner end of said outer manipulator member and having a pin transversely mounted therethrough;

said outer manipulator member has a pair of diametrically opposed elongated slots in an inner end portion thereof with said slots being disposed along the longitudinal axis of said inner manipulator member and opening at the inner end of said inner manipulator member;

said body member has a pair of diametrically opposed pins extending into the hollow portion thereof, said pins being engagable in said outer manipulator member slots to rotatably secure said outer manipulator member and said body member;

said connector has an enlarged head end portion with a central opening longitudinally oriented relative to the longitudinal axis of said manipulator means and a pair of oppositely facing diametrically opposed generally J-shaped slots opening with the straight segment of said slots directed toward said manipulator means to receive and engage said pins for operably joining said connector and said inner manipulator member.

13. In a tool that is used for removing and replacing a valve on an operating wellhead assembly and which has an elongated housing with a fluid coupling on one end mountable with a fluid coupling of a valve on the wellhead, a packing means mountable in a conduit to the valve to temporarily block fluid flow through the conduit, means associated with said housing to displace said packing means through said valve and into said conduit and to secure said packing means in the conduit, an improvement including:

a reamer removably connected to the means to displace for clearing the conduit of obstructions so the packing assembly can be inserted into the conduit;

said reamer including a body with a coupler on one end thereof connectable with said means to extend and a plurality of spaced cutters around the exterior of said body, said cutters defining a small diameter cutting surface at an inner end of said body opposite said coupler with said cutters tapering to a larger diameter cutting surface at an opposite outer end thereof such that said small diameter cutting surface will pass within the inner diameter of an obstruction in said conduit and said cutters will remove the obstruction upon rotation and longitudinal motion of said reamer.

14. A tool for removing and replacing a valve of an operating wellhead assembly comprising:

an elongated housing having a fluid coupling on one end adapted to be mounted with a fluid coupling of a valve of the wellhead assembly;

sealing means adapted to be mounted in a conduit of the wellhead assembly which joins said valve to temporarily block fluid flow through said conduit;

latching means associated with said sealing means to temporarily secure said sealing means within said wellhead assembly;

an actuator mounted within said housing for rotative and longitudinal movement, said actuator removably connected to said sealing means and operable to selectively engage and release said latching means;

a piston and cylinder combination associated with said actuator and said housing including a cylinder formed by a portion of said housing and a piston on said actuator, said piston and cylinder combination being operable to move said actuator between extended and retracted positions for moving said sealing means into the conduit and for removing the sealing means from said conduit; and fluid control means for said piston and cylinder combination to control the fluid pressure on opposite sides of said piston in order to control the position of said actuator.

15. A method of replacing a valve on an operating wellhead including the steps of:
(a) closing a valve which is to be removed and removing any apparatus from the outlet thereof;
(b) mounting a reaming tool with an extendable, retractable, and rotatable manipulator of a valve removal tool;
(c) mounting a housing of the valve removal tool with the valve and opening the valve;
(d) extending the manipulator to bring the reamer in contact with an obstruction in the wellhead;
(e) rotating the reamer with the manipulator to cut and remove the obstruction;
(f) retracting the reamer assembly from the wellhead by retracting the manipulator;
(g) closing the valve;
(h) removing the valve removal tool including the reamer from the valve;
(i) mounting the housing of the valve removal tool with the valve;
(j) opening the valve;
(k) extending the manipulator of the valve removal tool to displace a packing assembly through the valve and into the wellhead;
(l) securing the packing assembly in the wellhead by operating the manipulator to seal fluid flow through the conduit and to mount the packing assembly in a fixed position;
(m) disconnecting the manipulator from the packing assembly;
(n) disconnecting the valve and the valve removal tool from the wellhead;
(o) removing the valve from the valve removal tool housing and mounting a replacement valve on the valve removal tool housing;
(p) mounting the replacement valve with the wellhead;
(q) extending the manipulator to engage the packing assembly;
(r) releasing the packing assembly by operating the manipulator;
(s) retracting the packing assembly from the wellhead to a location downstream of the valve member in the replacement valve;
(t) closing the replacement valve; and
(u) removing the valve removal tool housing and packing assembly from the replacement valve.

16. A tool for use in the removal of a valve mounted on a wellhead assembly exposed to operating pressure, said tool comprising:

a housing adapted to be temporarily mounted to a downstream end of the valve remote from the wellhead assembly;

a shaft mounted to said housing for longitudinal movement between an extended position wherein the shaft extends substantially through the valve and a retracted position wherein the shaft is retracted out of the valve;

a sealing and latching mechanism carried on the shaft, said mechanism having means for forming a fluid-tight seal upstream of the valve in the extended position of the shaft to seal the valve from the operating pressure of the wellhead assembly;

latching means on said mechanism having a latched condition to temporarily secure the mechanism in a fixed position upstream of the valve and an unlatched condition permitting movement of the sealing and latching mechanism;

means for detachably mounting said sealing and latching mechanism on said shaft for movement therewith through the valve, said detachable mounting means being releasable to disconnect said mechanism from the shaft for removal of the valve; and means for preventing disconnection of said mechanism from the shaft except when said latching means is in the latched condition.

17. A tool for use in the removal of a valve mounted on a wellhead assembly exposed to operating pressure, said tool comprising:

a housing adapted to be temporarily mounted to a downstream end of the valve remote from the wellhead assembly;

a tubular outer manipulator member mounted to said housing for longitudinal movement so as to be capable of being extended through and retracted out of the valve, said outer member having an inner end portion presenting external splines thereon;

a shaft extending through said outer member and having an inner end portion extending beyond the inner end portion of said outer member, said inner end portion of the shaft presenting external splines thereon;

a sealing and latching head member detachably mounted to the outer member and shaft for extension through and retraction out of the valve;

packing means on said head member including a packing actuator operable upon rotation to expand said packing means into a sealed condition to form a fluid-tight seal upstream of the valve to seal the valve from the operating pressure of the wellhead assembly, said actuator presenting internal splines for mating engagement with the splines of said outer manipulator member to rotate the actuator upon rotation of the outer member while permitting longitudinal movement of said outer member to disconnect same from said head member; and latching means on said head member operable upon rotation thereof to latch the head member in a fixed position upstream of the valve, said latch means presenting internal splines for mating engagement with the splines of said shaft to rotate the latching means upon rotation of the shaft while permitting longitudinal movement of the shaft to disconnect same from the head member.

18. The tool of claim 17, including means engaging the splines of said shaft in a manner to prevent longitudinal movement of the shaft for disconnection thereof from the head member except when the shaft is in a rotative position relative to the head member wherein said latching means is in a latched condition to latch said head member in a fixed position.

19. A tool for use in the removal of a valve mounted on a wellhead assembly exposed to operating pressure, said tool comprising:

a housing adapted to be temporarily mounted to a downstream end of the valve remote from the wellhead assembly;

a shaft mounted to said housing for longitudinal extension through the valve and retraction out of the valve;

a sealing head carried on the shaft and including a packing member which is expansible into a sealed condition to form a fluid-tight seal upstream to the valve to seal the valve from the operating pressure of the wellhead assembly;

a pair of threaded members on the sealing head carrying the packing member therebetween and movable toward one another to expand the packing member into the sealed condition thereof, one of said threaded members presenting relatively coarse threads and the other threaded member presenting relatively fine threads;

a connector having coarse threads engaging the coarse threads of said one threaded member and fine threads engaging the fine threads of said other threaded member, whereby rotation of said connector in one direction effects movement of said threaded members toward one another to expand said packing member into the sealed condition thereof; and means for coupling said shaft with said connector in a manner to effect rotation of the connector in response to rotation of the shaft.

* * * * *